United States Patent Office 2,726,275
Patented Dec. 6, 1955

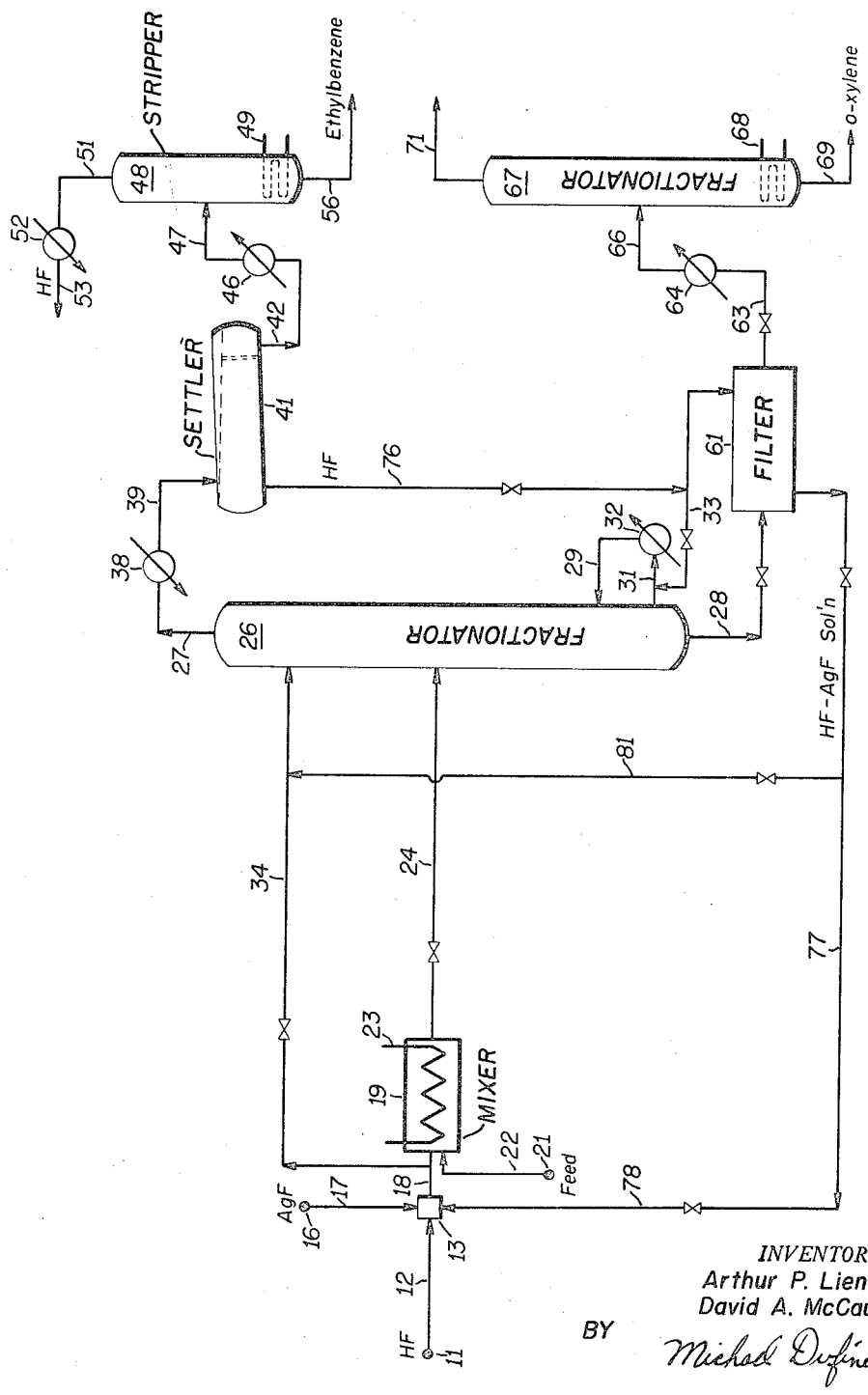

2,726,275

SEPARATION OF ETHYLBENZENE FROM MIXED $C_8H_{10}$ AROMATIC HYDROCARBONS

Arthur P. Lien, Highland, Ind., and David A. McCaulay, Chicago, Ill., assignors to Standard Oil Company, Chicago, Ill., a corporation of Indiana Application November 20, 1951, Serial No. 257,356

11 Claims. (Cl. 260—674)

This invention relates to the separation of a mixture of $C_8H_{10}$ aromatic hydrocarbons into an ethylbenzene-rich fraction and a xylene-rich fraction. More particularly, it relates to the separation of a high purity ethylbenzene fraction from admixture with isomeric xylenes. Still more particularly, it relates to the separation of a mixture of ethylbenzene and meta-xylene into a substantially pure ethylbenzene fraction and a substantially pure meta-xylene fraction.

Ethylbenzene has considerable commercial importance as the raw material for styrene manufacture. Ortho and para-xylene have become important commercially as raw materials for the manufacture of certain synthetic resins. At present ethylbenzene is produced commercially by the alkylation of benzene. Ethylbenzene and xylenes occur naturally in most hydrocarbon mixtures; a particularly good source of these $C_8$ aromatics is the naphtha derived from the catalytic treatment of a virgin petroleum naphtha. In nature, ethylbenzene and the isomeric xylenes are always found together. Because of the very slight difference in boiling point between ethylbenzene and the xylenes, it is extremely difficult to separate the mixture into high purity fractions by fractional distillation. The preferred method for the physical separation of a substantially pure mixed $C_8$ aromatic hydrocarbon is by fractional crystallization. A very recently introduced procedure for obtaining a substantially ethylbenzene-free xylene mixture consists in treating a mixed $C_8$ aromatic with $BF_3$ in the presence of liquid HF. The $BF_3$ catalyzes the disproportionation of the ethylbenzene into diethylbenzene and benzene; these materials are readily separable by distillation from the isomeric xylenes. Thus the xylene product is obtained at the expense of ethylbenzene recovery.

It is an object of our invention to separate a mixture of $C_8H_{10}$ alkylbenzenes into an ethylbenzene-rich fraction and a xylene-rich fraction. Another object is to separate a mixture of ethylbenzene and at least one isomeric xylene into an ethylbenzene-rich fraction and a xylene-rich fraction. Still another object is to separate a mixture of ethylbenzene and at least one isomeric xylene into a substantially pure ethylbenzene fraction and a high purity xylene fraction.

We have discovered that pure aromatic hydrocarbons form a complex with silver fluoride in the presence of liquid HF. The liquid HF should be substantially anhydrous, i. e., it should contain less than about 1 or 2% of water. We believe that the complex obtained by the treatment of a monocyclic alkylbenzene: such as, benzene, toluene, ethylbenzene, xylene, trimethylbenzene and other alkylbenzenes boiling below about 450° F., with AgF in the presence of liquid HF contains three components; namely, for each mol of complex: 1 mol of AgF, 3 mols of aromatic and probably at least 1 mol of HF. We believe that HF is a necessary constituent of the complex because no complex is formed in the absence of HF, but we do know just how much HF is contained therein. The complex is extremely soluble in liquid HF. In fact, the solubility is so great that it is possible to have more AgF present in the liquid HF-complex solution than is soluble in pure liquid HF. While AgF is quite soluble in liquid HF, enough liquid HF is present in a saturated solution to participate in the formation of the complex and to dissolve the complex formed.

Silver fluoride is a crystalline solid with a melting point of 815° F. It is very soluble in liquid HF and passes into solution readily. The solubility at about 0° F. is 33 grams per 100 grams of HF or 0.26 mols of AgF per 100 ml. of liquid HF. The AgF may be recovered from its solution with liquid HF by vaporizing the HF.

The low-boiling aromatics such as benzene and xylene are only slightly soluble in liquid HF at ambient tempertures, i. e., about 2–3 volume percent. However, the solubility of the aromatic in liquid HF is enormously increased by adding AgF to the liquid HF. For each mol of AgF present in the liquid HF, 3 mols of aromatic hydrocarbon pass into solution in the liquid HF. By the use of sufficient AgF and liquid HF, it is possible to dissolve any particular amount of aromatic completely so that only one phase appears in the vessel. While the theoretical amount of AgF is one-third mol per mol of aromatic to be dissolved, we have found that complete solution can be attained by using slightly less than the theoretical amount because the complex solubilizes into the liquid HF phase more aromatic than is soluble in liquid HF alone.

We have also discovered that it is possible to extract these low-boiling aromatics away from admixture with non-aromatic hydrocarbons, such as, paraffins and naphthenes, by treating the mixture with liquid HF-AgF treating agent. The amount of aromatic extraction in a single contacting stage is close to the theoretical, based on the amount of AgF present in the liquid HF, up to aromatic extractions of about 75 volume percent, based on aromatics in said mixture. Surprisingly enough, it is necessary to use a very considerable excess of AgF over the theoretical one-third mol per mol of aromatic to be extracted when aromatic recoveries much in excess of about 75% are desired. The excess is dependent somewhat upon the particular aromatic present in the feed mixture, but in the case of the $C_8$ aromatics, recoveries on the order of 90% are obtainable using 0.6 mol of AgF and virtually complete recovery can be attained using about 1 mol of AgF.

The extract phase from the treatment of a mixed feed contains some non-aromatics in addition to the treating agent and aromatics. The amount of non-aromatics present in the extract is dependent upon the amount of AgF used and the amount of liquid HF used in the extraction. In general, less than 20% of the extract hydrocarbons will be non-aromatic in nature.

The amount of liquid HF present in the treating agent may be between about 10 and as much as 1500 or more volume percent based on aromatics in the feed mixture. In general, the more liquid HF present, the better the phase separation. However, good phase separation is obtained using as little as 50 volume percent of liquid HF. At a fixed AgF usage the selectivity of aromatic extraction improves with liquid HF usage; at about 600% of liquid HF the extract hydrocarbons will contain the low amount of about 2% of non-aromatics. At constant liquid HF usage, the degree of aromatic selectivity increases with increase in excess AgF usage. At an AgF level of about 1 mol per mol of aromatic in the feed, the extract hydrocarbons will contain on the order of 2% of non-aromatics when as little as 75 volume percent of liquid HF is used. We prefer to use between about 75 and 600 volume percent of liquid HF and particularly, we prefer to use between 200 and 500 volume percent of liquid HF.

The temperature of contacting should be maintained below about 250° F. in order to minimize cracking and isomerization reactions. In general, temperature has very little effect on degree of separation when the contacting is carried out at below about 160° F. Temperatures below about 30° F. have some effect on the efficiency of the process because of the increase in viscosity of the hydrocarbons at low temperatures. In general, we prefer to operate at ambient temperature, that is, between about 30 and 100° F. It is to be understood that when operating above about the boiling point of HF, that is, about 70° F., it is necessary to maintain superatmospheric pressure on the system, for example, at 160° F. we would operate at about 100 p. s. i. g.

The complex that exists in the extract phase from the treatment of a mixture of $C_8$ aromatics and non-aromatic hydrocarbons with our liquid HF-AgF treating agent behaves like the complex formed by treating a pure aromatic with the treating agent. The complex is stable in the presence of liquid HF at the temperature of operations normally used in solvent extraction. Of course when operating at temperatures above the boiling point of HF, it is necessary to apply superatmospheric pressure to the system in order to maintain the HF in the liquid state. The extracted hydrocarbons can be recovered from the extract phase by heating the extract phase and distilling the HF, whereupon the extract and solid AgF remain behind; the solid AgF and extract hydrocarbons are readily separable by decantation, filtration, centrifuging or by distilling the aromatics. The AgF recovered by this method may be reused in the process.

The extract hydrocarbons may also be recovered from the extract phase by treating said extract phase with water, whereupon the extract hydrocarbons appear as a separate phase which may be decanted from the lower aqueous layer. This latter method of separation is particularly well suited for laboratory operations.

The feed stock to the above described process may be any aromatic-containing hydrocarbon mixture boiling below about 450° F. The presence of aromatics and non-aromatics boiling above this point tends to interfere with phase separation and introduces side reactions that interfere with the production of substantially pure aromatics. The presence of olefins in the feed to this process is undesirable because some of the aromatics are alkylated by the olefins in the presence of liquid HF. This alkylation reaction decreases the yield of the desired aromatics. This is the only objectionable feature to the presence of olefins in the feed. The phenolic compounds that are present in many aromatic-containing naphthas react with AgF and appear in the extract phase. The presence of these phenolic compounds in the extract hydrocarbons renders difficult the recovery of substantially pure aromatics because the boiling point of these phenolic compounds overlaps that of many of the aromatic constituents of the naphtha. (These phenolic compounds are readily reduced to an innocuous level by caustic washing of the raw naphtha.) The organic sulfur compounds which are present in most aromatic-containing naphthas form a complex with AgF. These complexes are relatively insoluble in the liquid HF and act to emulsify the raffinate phase and the extract phase, thereby rendering phase separation difficult. We prefer to operate on a substantially sulfur-free stock, i. e., a stock containing less than about 0.02 wt. percent of sulfur. A particularly suitable feed stock to our aromatic recovery process is a hydroformate boiling below about 325° F.

The above process is described and is claimed in our application S. N. 251,692, filed October 17, 1951, entitled "Extraction of Aromatics From Naphthas."

We have also discovered that the complex formed by the isomeric xylenes is more stable than the complex formed by ethylbenzene. As a result of the difference in dissociation constant it is possible to separate a mixture of ethylbenzene and xylene into an ethylbenzene-rich fraction and a xylene-rich fraction by a liquid-liquid extraction procedure using liquid HF-AgF treating agent as the solvent. While some separation can be attained when using from a very small amount of AgF to as much as 0.6 mol of AgF per mol of aromatic present in a mixture of $C_8$ aromatics and non-aromatics, a maximum yield of ethylbenzene-rich fraction is obtained when using between about 0.25 and 0.40 mols of AgF per mol of xylene present in the feed mixture. The amount of liquid HF present in the treating agent is important to the degree of separation; some separation can be attained using as little as 10 volume precent of liquid HF based on xylene in the feed. We prefer to operate with between about 200 and 600 volume percent of liquid HF based on xylene in the feed. The temperature of contacting also has an important bearing on the degree of separation attainable. We prefer to operate below about 160° F. and preferably we operate between about 50 and 120° F. Operating at the above conditions on a substantially pure $C_8$ aromatic mixture, we are able by the use of continuous countercurrent contacting to produce a substantially pure ethylbenzene fraction and a substantially pure xylene fraction. The countercurrent tower in this operation requires about 50 theoretical extraction stages. The above described liquid-liquid extraction process for the separation of ethylbenzene and xylene is described and claimed in our application S. N. 257,357, filed November 20, 1951, and entitled "Extraction of Ethylbenzene From Naphthas."

The problem of separating two difficultly separable liquids has been extensively examined in recent years. A particularly good exposition has been made by Colburn and Schoenborn in Trans. Amer. Inst. Chem. Engrs., 41, 421–443, 645 (1945). The difficulty of separation of two liquids is measured by relative volatility, for vapor-liquid systems, and relative distribution ratio, for liquid-liquid systems, $$\alpha = \frac{y_1/y_2}{x_1/x_2}$$

where, $\alpha$ = relative volatility or relative distribution ratio, $y_1$ and $y_2$ = mol fraction of the two components in one phase, and $x_1$ and $x_2$ = mol fraction of the two components in the other phase. Colburn gives an approximate method of calculating the number of theoretical stages needed to obtain 99% purity fractions at a practical reflux ratio, $$N_p = 18.4/\alpha - 1$$

Normally, a $C_8$ aromatic mixture contains ethylbenzene, o-xylene, m-xylene and p-xylene. These boil within the same range, as shown by the values given by "National Bureau of Standards, C461, November 1947, p. 67."

|  | B. P., ° F. | F. P., ° F. |
| --- | --- | --- |
| ortho-xylene | 291.95 | −13.32 |
| meta-xylene | 282.38 | −54.17 |
| para-xylene | 281.03 | +55.87 |
| ethylbenzene | 277.14 | −138.96 |

The boiling point spread of 9.5° F. between ortho-xylene and meta-xylene permits separation by super fractional distillation without the use of a prohibitive number of theoretical plates. Ethylbenzene, p-xylene and m-xylene are considered to be inseparable by fractional distillation. The relative volatility for ethylbenzene and p-xylene is about 1.05, which means that about 370 theoretical plates are needed for separation by fractional distillation.

The relative distribution ratio between ethylbenzene and paraxylene at ambient temperature in the presence of liquid HF-AgF treating agent is about 1.36. Thus it is possible with our liquid-liquid extraction process to separate ethylbenzene and para-xylene into fractions of about 99% purity by the use of about 50 theoretical extraction stages. We have now discovered that it is possible to obtain even better separation factors by the use of a vapor-liquid system of separating ethylbenzene and xylene in the presence of liquid HF-AgF treating agent.

The degree of separation that is obtainable in a single vapor-liquid separation stage between ethylbenzene and para-xylene by our improved process is illustrated by the following runs. In both runs a single-plate separation was simulated by carrying out the reaction in a carbon steel reactor equipped with a 1725 R. P. M. stirrer. Solid AgF, 0.3 mol per mol of aromatic in the feed mixture, was added to the reactor. In each run 250 volume percent of liquid HF based on total aromatics in the feed was added to the reactor after the AgF addition. Lastly, the feed was added. In both runs the feed consisted of an equal molar mixture of ethylbenzene and para-xylene. The contents of the reactor were agitated at different temperatures and the vapor phase existing in the reactor was bled out through a throttling valve into a condenser-receiver. A sufficiently large sample of the vapor phase was withdrawn to provide enough hydrocarbon for an ultraviolet absorption analysis. The hydrocarbons were recovered from this overhead fraction by dilution with water, followed by decantation and washing of the hydrocarbon phase. The liquid bottoms phase was decomposed with cold water; the oil layer was decanted from the aqueous layer and then washed with aqueous caustic and pure water to remove HF. The hydrocarbons from each phase were analyzed by ultraviolet absorption. Within the limits of analytical determination, no disproportionation of the ethylbenzene or isomerization of para-xylene was found. The results of these runs are given below.

| Run | Tempera-ture, °F. | Vapor | | Liquid | | $\alpha$ |
|---|---|---|---|---|---|---|
| | | EB | pX | EB | pX | |
| 1 | 122 | 60.1 | 39.9 | 50.8 | 50.4 | 1.46 |
| 2 | 167 | 57.8 | 42.2 | 49.2 | 49.6 | 1.35 |

Thus by the use of a vapor-liquid process at about 125° F., it is possible to obtain about 25% better separation, i. e., in about 25% fewer theoretical plates than by the use of a liquid-liquid extraction process. By our vapor-liquid process, operating at a temperature of about 130° F. or somewhat lower, it is possible to obtain substantially pure ethylbenzene, that is about 99% pure, from a mixture of ethylbenzene and xylene by using a tower containing about 40 theoretical plates; this means a tower containing about 70 actual plates, which size tower is now in more or less common use in the petroleum industry.

As is evident in the data presented above, the relative volatility obtainable with our process decreases with increase in temperature. However, even at 170° F. the relative volatility is still as good as that obtainable in the liquid-liquid extraction process at lower temperatures. A theoretical plate may represent no more than about 2 feet of column height; whereas a single theoretical extraction stage may require 8 or more feet of tower height. Thus a very considerable saving in investment will result from the use of our vapor-liquid system over our liquid-liquid system even at the same separation factor.

While we may operate our vapor-liquid system for the separation of ethylbenzene and xylene at temperatures as high as about 250° F., we prefer to operate at temperatures below 175° F. and, in particular, we prefer to operate at a temperature of below about 130° F. Temperatures lower than about 70° F. can be used by operating the distillation tower under vacuum. In order to obtain maximum possible relative volatility and realize practicable throughputs we prefer to operate at between about 100° F. and about 130° F.

We have found that the presence of olefins in the feed to our process decreases the yield of ethylbenzene and xylene because the aromatics are alkylated by the olefins. Furthermore, the alkyl aromatics appear in the xylene bottoms from the tower and must be separated from the xylenes in order to obtain high purity xylenes. The presence of phenolic compounds in the feed is undesirable because the phenolic compounds appear in both the ethylbenzene overhead and the xylene bottoms. While these phenolic compounds may be removed by caustic washing of the product, we prefer to remove the phenolic compounds prior to the vapor-liquid separation step. The presence of organic sulfur compounds is undesirable because the organic sulfur compounds complex with the silver to form solid compounds which precipitate out on the fractionation trays and interfere with efficiency of separation of each plate. We have found that non-aromatic hydrocarbons, other than olefins, pass out of the separation system along with the ethylbenzene and HF overhead and appear as an impurity in the ethylbenzene-rich fraction. These non-aromatics are difficultly separable from the ethylbenzene by fractional distillation. Therefore, when it is desired to obtain a high-purity ethylbenzene fraction, the feed to the separation system should be substantially free of non-aromatics. In general, we prefer to use a feed mixture to our process which is a substantially pure $C_8$ aromatic hydrocarbon mixture.

Suitable feed stocks to our process are the xylene cut of the light oil obtained from the coking of coal or the xylene cut obtained by the extractive distillation of a 245° to 300° F. cut of a hydroformate derived from the treatment of a virgin naphtha at 850 to 1050° F. in the presence of hydrogen and a molybdena-on-alumina or platinum-containing catalyst. A preferred feed to our process is the xylene fraction obtained by the treatment of a naphtha with our liquid HF-AgF treating agent.

At a fixed HF usage, the relative volatility at a given temperature is substantially independent of the amount of AgF present in the treating agent, as long as the AgF present is less than about 0.4 mol per mol of aromatic in the feed. However, the yield of the vapor fraction is dependent upon the amount of AgF present in the treating agent. The more AgF present in the treating agent, the lower the yield of the vapor fraction until at about 0.4 mol virtually no vapor fraction exists. Maximum yield of ethylbenzene in the vapor fraction is obtained at an AgF usage of about one-third mol per mol of xylene present in the feed. In general, the amount of AgF used should be about one-third mol per mol of xylene in the feed, but some flexibility in operation of the system can be obtained by changing slightly the amount of AgF present. Normally best results will be obtained when the amount of AgF in the treating agent is between about 0.25 and 0.4 mols of AgF per mol of xylene in the feed.

The amount of HF present in the system must be, at the minimum, sufficient to participate in the formation of the complex and to dissolve the complex, and also to act as a stripping gas to carry the hydrocarbons up the tower. However, we have found that the amount of HF present has an effect on the relative volatility at a given AgF level and at a given temperature of operation. Thus while we can operate with as little as 10 volume percent of HF based on aromatics in the feed and as much as 1500 volume percent of HF, we prefer to use between about 100 volume percent and about 600 volume percent. When using between about 250 and 500 volume percent of HF, based on aromatics in the feed, and operating between about 100 and 130° F., an alpha of about 1.45 is obtained.

Some enrichment can be obtained by simple distillation, i. e., a single plate separation. For example, the mixed $C_8$ aromatic feed may be contacted with 200 volume percent of liquid HF and about one-third mol of AgF per mol of xylene in a vessel equipped with a heater and the vapors condensed to give an ethylbenzene-enriched fraction. Even at an alpha of 1.45, the amount of enrichment is quite slight and of no commercial interest.

We prefer to operate our system in a distillation tower, which tower may be equipped with packing or with bubble trays. In this tower operation the feed is introduced at about the vertical mid-point of the tower, and liquid HF-AgF treating agent is introduced near the top of the tower. The proper heat gradient in the tower is obtained by the use of a reboiler at the base of the tower in order to maintain the base of the tower at a temperature great enough to decompose the complex and to boil-up HF and xylene vapors. The feed per se can be charged to the tower, or preferably it can be admixed with treating agent prior to introduction into the tower. When the feed and treating agent are mixed before entering the tower, sufficient liquid HF-AgF solution must be introduced near the top of the tower in order to provide a stripping action above the feed tray. The amount of AgF in this treating agent reflux should be just sufficient in amount to complex with the amount of xylene reflux introduced near the bottom of the tower.

Usually in this specification, we refer to xylene as the other aromatic component of the ethylbenzene-containing feed to our process. By the term xylene, we mean any one of the xylene isomers or a mixture thereof. We use the generic term xylene because we have found that, within the limits of experimental error, no separation can be made between the individual xylene isomers by our liquid HF-AgF treating agent. Similarly, when we refer to $C_8$ aromatics we mean a mixture of ethylbenzene and any one or more of the xylene isomers.

The figure shows a method for the recovery of a high purity, about 95%, ethylbenzene fraction and a high purity mixed xylene fraction from a feed stock consisting of a mixture of $C_8H_{10}$ aromatics. This particular feed stock was derived from the hydroforming of a West Texas virgin naphtha. The total hydroformate, containing benzene, toluene, $C_8$ aromatics, some olefins and about 50% of non-aromatics, was treated with 1 mol of AgF per mol of aromatic and 200 volume percent of HF at a temperature of 70° F. The extract phase contained substantially all the aromatics along with some non-aromatics. The extract non-aromatics were removed by washing with pentane. The washed extract phase was decomposed by heating to about 150° F., vaporizing all the HF and pentane. The extract hydrocarbons were filtered from the solid AgF and separated by distillation into substantially pure benzene, toluene and mixed $C_8$ fraction. The substantially pure mixed $C_8$ fraction contains about 40% of ethylbenzene and 60% isomeric xylenes.

Liquid HF from source 11 is passed through line 12 into vessel 13. Silver fluoride from source 16 is passed through line 17 into vessel 13 where it is dissolved by the liquid HF. The liquid HF-AgF treating agent is passed by way of line 18 into mixer 19. The mixed $C_8$ aromatic feed from source 21, prepared as described above, is passed by way of line 22 into mixer 19.

In this illustration we use in mixer 19 about 250 volume percent of liquid HF, based on total aromatic feed, and one-third mol of AgF per mol of xylene in the feed. Mixer 19 is provided with a heater 23 and the contents of the mixer are raised to a temperature of about 130° F. The pressure in the mixer is maintained high enough to keep the HF in the liquid state. The contents of the mixer are passed through valved line 24 into fractionator 26.

Fractionator 26 may be equipped with conventional packing or bubble trays. In this illustration we use a tower equipped with 75 bubble trays. The treating agent-aromatic feed to the tower is introduced by line 24 at about the vertical mid-point of fractionator 26. Of course, the liquid on the feed tray should have an aromatic composition very close to the composition of the aromatic feed.

The conditions of operation of fractionator 26 are so adjusted that a vapor stream of HF and high purity ethylbenzene are taken overhead through line 27. The tower top temperature will be at about the temperature of the feed plate, i. e., about 130° F. The temperature in the bottom of the tower should be about the boiling point of xylene at the particular pressure of operation. The AgF from the complex exists in the bottom of fractionator 26 in the form of a finely divided solid which is slurried in the boiling xylene. A portion of the xylene-AgF slurry is withdrawn by way of line 28.

A reflux stream of xylene is introduced a few trays above the bottom of fractionator 26 by way of line 29. This reflux is obtained by passing a part of the xylene in the bottom of the fractionator via line 31, through reboiler 32 and then into a higher part of the fractionator through line 29. The reboiler 32 provides the additional heat necessary to maintain the proper temperature gradient in the fractionator. The reflux xylene may be between about 1 and 30 volumes per volume of xylene product withdrawn through line 28. Additional HF may be needed near the bottom of the tower; this is introduced through lines 33 and 31, so that the HF is heated before entering the tower.

A reflux stream of liquid HF-AgF is introduced into a tray near the top of the fractionator, by way of line 34 (from line 18). The amount of liquid HF and AgF in this reflux is enough to maintain the HF in the tower at about 250 volume percent based on feed and xylene reflux and the AgF at about one-third mol per mol of xylene in the feed and in the xylene reflux.

The overhead fraction in line 27 is passed through cooler 38 where the HF and aromatics are condensed. The liquids are passed through line 39 into settler 41. The upper ethylbenzene layer, containing some HF, is withdrawn through line 42, heater 46 and line 47 into stripper 48, which has an internal heater 49. The temperature in stripper 48 is maintained at about 100° F. and atmospheric pressure to remove the HF only. The HF passes out through line 51, is condensed in cooler 52 and is recycled to the treating agent through line 53 and other lines not shown.

The stripped bottoms, i. e., the high purity ethylbenzene product, are withdrawn from stripper 48 and are sent to storage, not shown, via line 56.

The xylene fraction, containing solid AgF, is withdrawn from the bottom of fractionator 26 through line 28 and is passed into filter 61. Filter 61 may be any type of HF-resistant, HF vapor-tight filter of the plate and frame type, rotary type, etc. We prefer to use a filter of the Sweetland type. The xylene fraction is passed out of filter 61 through line 63, heater 64, and line 66 into fractionator 67.

Fractionator 67 is equipped with a reboiler 68 and a sufficient number of bubble trays to separate from the mixed xylenes a high purity o-xylene fraction. The o-xylene fraction is withdrawn by way of line 69 and sent to storage not shown. The overhead from fractionator 67 consists of meta and para-xylene and some ethylbenzene; this fraction is sent to storage by way of line 71.

Liquid HF from settler 41 is passed through line 76 into filter 61 where it dissolves the retained AgF. A portion of the liquid HF in line 76 is passed into line 33 and then into tower 26, when additional HF is needed in the tower. Liquid HF-AgF solution is passed out of filter 61 through lines 77 and 78 to vessel 13 or, may in part, be passed through line 81 to line 34. While we have shown only one filter, we actually use 2 or more in order to have a continuous process.

It is to be understood that the above described embodiment of our invention is submitted by way of example and does not include all the variations which can easily be made by one skilled in the art; such variations will be dependent upon the particular feed stock used and the operating conditions desired.

We claim:

1. A process for the treatment of a hydrocarbon feed which contains ethylbenzene and at least one xylene as the only aromatic constituents, which process comprises contacting said feed at a temperature below about 250° F. with a treating agent consisting of between a trace and not more than about 0.6 mol of silver fluoride per mol of aromatic in said feed and between about 100 and 600 volume percent of liquid HF based on aromatics in said feed, to obtain a vapor phase consisting of HF, any non-aromatics and ethylbenzene-rich aromatics and a bottoms fraction consisting essentially of liquid xylene-rich aromatics and solid AgF.

2. The process of claim 1 wherein the amount of AgF in said treating agent is between about 0.25 and 0.40 mol per mol of xylene in said feed.

3. The process of claim 1 wherein the temperature of operation is below about 175° F.

4. The process of claim 1 wherein said feed is substantially free of organic sulfur compounds and phenolic compounds.

5. A process for treatment of an aromatic feed consisting essentially of ethylbenzene and at least one xylene, which process comprises countercurrently contacting said feed at a temperature below about 250° F. with a treating agent consisting essentially of about 100 to 600 volumes of liquid HF based on aromatics in said feed, and between a trace and not more than about one-third mol of AgF per mol of aromatics in said feed, to obtain a vapor phase consisting essentially of HF and ethylbenzene-rich aromatics and a bottoms fraction consisting essentially of solid AgF and liquid xylene-rich aromatics.

6. The process of claim 5 wherein the temperature is below about 175° F.

7. The process of claim 5 wherein the amount of AgF is between about 0.25 and 0.40 mol per mol of xylene in said feed.

8. The process of claim 7 wherein the amount of liquid HF in said treating agent is between about 250 and 500 volume percent based on aromatics in said feed.

9. The process of claim 5 wherein a reflux of xylene is introduced at a point below the entry point of said feed and a reflux of treating agent is introduced near the exit for said vapor phase and wherein the AgF present in said agent reflux is about one-third mol per mol of xylene reflux and the liquid HF in said agent reflux is between about 100 and 600 volume percent based on said xylene reflux.

10. The process of claim 5 wherein said feed is a substantially pure mixed $C_8H_{10}$ aromatic hydrocarbon.

11. A process for the separation of a mixed $C_8H_{10}$ aromatic feed into a high purity ethylbenzene fraction and a high purity xylene fraction, which process comprises countercurrently contacting said feed at a temperature below about 130° F. with a treating agent consisting of about 250 volume percent of liquid HF, based on said feed, and about one-third mol of AgF per mol of xylene in said feed, to obtain a vapor phase consisting of HF and high purity ethylbenzene and a bottoms fraction consisting of solid AgF and liquid high purity xylene, recovering from said vapor phase HF and high purity ethylbenzene, recovering from said bottoms fraction AgF and high purity xylene, and wherein a reflux of xylene is introduced into a lower part of said countercurrent contacting zone and a reflux of treating agent is introduced into an upper part of said countercurrent contacting zone, which reflux of treating agent contains about 250 volume percent of liquid HF, based on xylene reflux, and about one-third mol of AgF per mol of xylene reflux.

References Cited in the file of this patent

UNITED STATES PATENTS

| | | |
|---|---|---|
| 2,246,257 | Kohn | June 17, 1941 |
| 2,378,762 | Frey | June 19, 1945 |
| 2,391,404 | Friedman et al. | Dec. 25, 1945 |
| 2,521,444 | Brooke et al. | Sept. 5, 1950 |
| 2,630,406 | Linn | Mar. 3, 1953 |
| 2,639,303 | Linn et al. | May 19, 1953 |

OTHER REFERENCES

Benesi et al.: J. Am. Chem. Soc., vol. 70, pages 2832–3 (1948).

Andrews et al.: J. Am. Chem. Soc., vol. 71, pages 3644–7 (1949).

McCaulay et al.: Ind. Eng. Chem., vol. 42, pages 2103–7 (1950).